US012667957B2

(12) United States Patent
Fang

(10) Patent No.: US 12,667,957 B2
(45) Date of Patent: Jun. 30, 2026

(54) TRANSMISSION DEVICE HAVING PLATFORM WITH MULTIPLE DEGREES OF FREEDOM

(71) Applicant: Point Robotics Medtech Inc., Hsinchu County (TW)

(72) Inventor: Ting-Yun Fang, Hsinchu County (TW)

(73) Assignee: Point Robotics Medtech Inc., Hsinchu County (TW)

( * ) Notice: Subject to any disclaimer, the term of this patent is extended or adjusted under 35 U.S.C. 154(b) by 0 days.

(21) Appl. No.: 18/957,836

(22) Filed: Nov. 24, 2024

(65) Prior Publication Data

US 2026/0027700 A1 Jan. 29, 2026

(30) Foreign Application Priority Data

Jul. 23, 2024 (TW) .................................. 113127412

(51) Int. Cl.
*B25J 9/00* (2006.01)

(52) U.S. Cl.
CPC .................................. *B25J 9/0033* (2013.01)

(58) Field of Classification Search
CPC ...... B25J 9/0033; B25J 9/0036; B25J 9/0039; B25J 9/0042; F16H 25/20; F16H 2025/2031; F16H 2025/204
See application file for complete search history.

(56) References Cited

U.S. PATENT DOCUMENTS

| | | |
|---|---|---|
| 2003/0005786 A1 | 1/2003 | Stuart et al. |
| 2020/0069373 A1* | 3/2020 | Yu ........................... A61B 34/10 |
| 2023/0118765 A1* | 4/2023 | Huang ................... A61B 34/10 606/1 |

(Continued)

FOREIGN PATENT DOCUMENTS

| | | | | |
|---|---|---|---|---|
| EP | 1501065 A1 * | 1/2005 | ............ | B25J 9/0042 |
| KR | 100264321 B1 * | 12/2000 | ............ | B25J 9/0036 |
| WO | WO9910137 A1 | 3/1999 | | |

OTHER PUBLICATIONS

"Transaxle Powertrain and Axle." Mallaky, Dec. 21, 2021, https://auto.mallaky.com/transaxle-powertrain-and-axle/ (Year: 2021).*

(Continued)

*Primary Examiner* — Joseph Brown
(74) *Attorney, Agent, or Firm* — Li & Cai Intellectual Property Office

(57) ABSTRACT

A transmission device having a platform with multiple degrees of freedom includes a main bracket, a pedestal, a mobile platform, a plurality of transmission assemblies, and a plurality of motor assemblies. The main bracket includes a base plate and a base column. The base plate includes a plurality of recesses formed on a side thereof, the base column has a plurality of mounting surfaces, and the recesses and the mounting surfaces are arranged in a staggered manner. The mobile platform includes a plurality of mechanical arm assemblies, and the mechanical arm assemblies are distributed in the plurality of recesses. The plurality of transmission assemblies are distributed on the mounting surfaces. Each of the transmission assemblies is connected to an adjacent one of the mechanical arm assemblies. The mechanical arm assemblies and the transmission assemblies are arranged in a staggered manner.

10 Claims, 14 Drawing Sheets

(56)             References Cited

U.S. PATENT DOCUMENTS

2024/0117591 A1*   4/2024  Gateau ..................... E02F 3/38

OTHER PUBLICATIONS

Wikipedia contributors. (Jul. 17, 2024). Ball bearing. In Wikipedia, The Free Encyclopedia. Retrieved 18:27, Oct. 30, 2025, from https://en.wikipedia.org/w/index.php?title=Ball_bearing&oldid= 1235111830 (Year: 2024).*
"Spicer Light Vehicle U-Joints." Spicer Parts, Mar. 20, 2023, Internet Archive: Wayback Machine. https://web.archive.org/web/ 20230320182303/https://spicerparts.com/parts/driveshaft/automotive/ spicer-light-vehicl (Year: 2003).*

* cited by examiner $46 \begin{cases} 46A \\ 46B \end{cases}$

TRANSMISSION DEVICE HAVING PLATFORM WITH MULTIPLE DEGREES OF FREEDOM

CROSS-REFERENCE TO RELATED PATENT APPLICATION

This application claims the benefit of priority to Taiwan Patent Application No. 113127412, filed on Jul. 23, 2024. The entire content of the above identified application is incorporated herein by reference.

FIELD OF THE DISCLOSURE

The present disclosure relates to a transmission device, and more particularly to a transmission device having a platform with multiple degrees of freedom.

BACKGROUND OF THE DISCLOSURE

A medical device, such as a surgical drill handpiece, generally includes a shaft motor, a parallel manipulator, and a coupler. The parallel manipulator is used to support a surgical tool and the shaft motor. The shaft motor is configured to provide a mechanical force for manipulating the surgical tool, while the coupler transmits the mechanical force provided by the shaft motor to the surgical tool.

In existing technology, assembling of components, such as the shaft motor, the parallel manipulator, and the coupler, begins by installing the shaft motor and the coupler onto a metal frame. Then, a linear guide rod of the coupler is inserted through a hole in a base plate, and the metal frame is fixed on the base plate by screws which are locked along a direction parallel to the linear guide rod. In that way, a medical device can be completed. Consequently, when one of the components breaks and needs to be repaired or replaced, it is necessary to disassemble the entire structure for repair or replacement, making maintenance inconvenient.

In addition, existing medical devices may have the problem of inconsistent assembly quality, and the driving-end friction force is difficult to adjust. This can lead to loosening of the medical devices during operation, resulting in insufficient stability and affecting operational precision.

SUMMARY OF THE DISCLOSURE

In response to the above-referenced technical inadequacies, the present disclosure provides a transmission device having a platform with multiple degrees of freedom, which solves the problem that assembling method of existing medical devices is complex and stability is insufficient.

In order to solve the above-mentioned problems, one of the technical aspects adopted by the present disclosure is to provide a transmission device having a platform with multiple degrees of freedom, which includes a main bracket, a pedestal, a mobile platform, a plurality of transmission assemblies, and a plurality of motor assemblies. The main bracket includes a base plate and a base column. The base plate is connected to one end of the base column. The base plate includes a plurality of recesses formed on a side thereof, the base column has a plurality of mounting surfaces, and the plurality of recesses and the plurality of mounting surfaces are arranged in a staggered manner. The pedestal is mounted to the other end of the base column. The mobile platform includes a plurality of mechanical arm assemblies, and the plurality of mechanical arm assemblies are distributed in the plurality of recesses. The plurality of transmission assemblies are distributed on the plurality of mounting surfaces. Each of the transmission assemblies is connected to an adjacent one of the mechanical arm assemblies. The plurality of mechanical arm assemblies and the plurality of transmission assemblies are arranged in a staggered manner. The plurality of motor assemblies are disposed on the pedestal, and the plurality of motor assemblies are coupled to the plurality of transmission assemblies, respectively.

Therefore, one advantage of the present disclosure is as below. In the disclosed transmission device having the platform with multiple degrees of freedom, through the structural design that the recesses and the mounting surfaces of the main bracket are arranged in a staggered manner, the plurality of mechanical arm assemblies of the mobile platform can be distributed in the recesses, while the transmission assemblies are distributed on the mounting surfaces. Thereby, the mechanical arm assemblies and the transmission assemblies can be assembled into a staggered arrangement structure, and assembling or disassembling of any one of the mechanical arm assemblies and the transmission assemblies will not be interfered by the others. This not only makes maintenance more convenient, but also enhances structural stability of the transmission device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
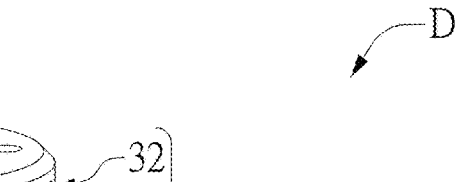
FIG. 1 is a schematic view of a transmission device having a platform with multiple degrees of freedom according to an embodiment of the present disclosure.
Figure 2:
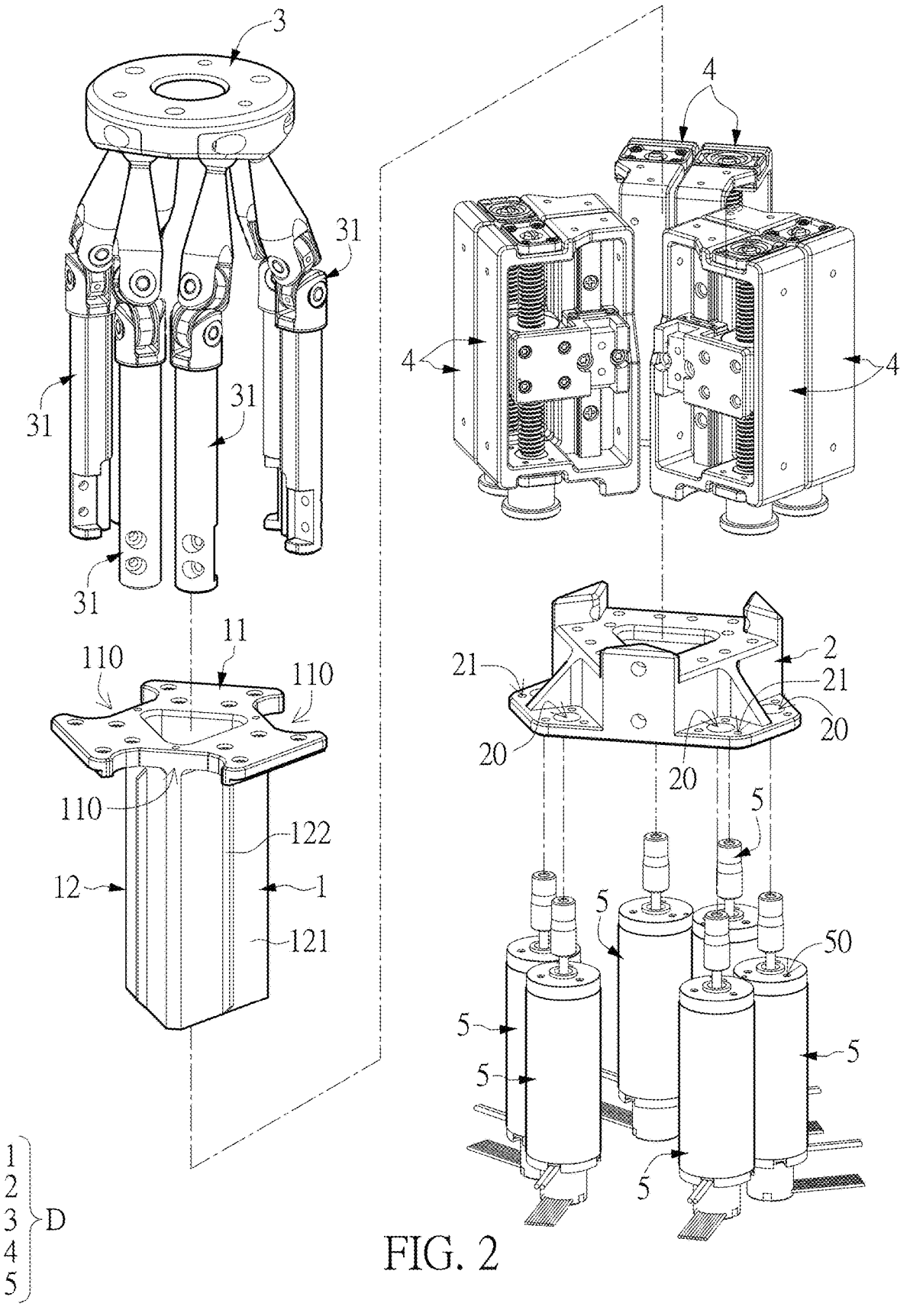
FIG. 2 is a schematic exploded view of the transmission device having the platform with multiple degrees of freedom according to the embodiment of the present disclosure.

Reference is made to FIG. 1 and FIG. 2. An embodiment of the present disclosure provides a transmission device having a platform with multiple degrees of freedom, which can be applied to a medical device, such as a surgical drill. The transmission device D includes a main bracket 1, a pedestal 2, a mobile platform 3, a plurality of transmission assemblies 4, and a plurality of motor assemblies 5.

Figure 3:
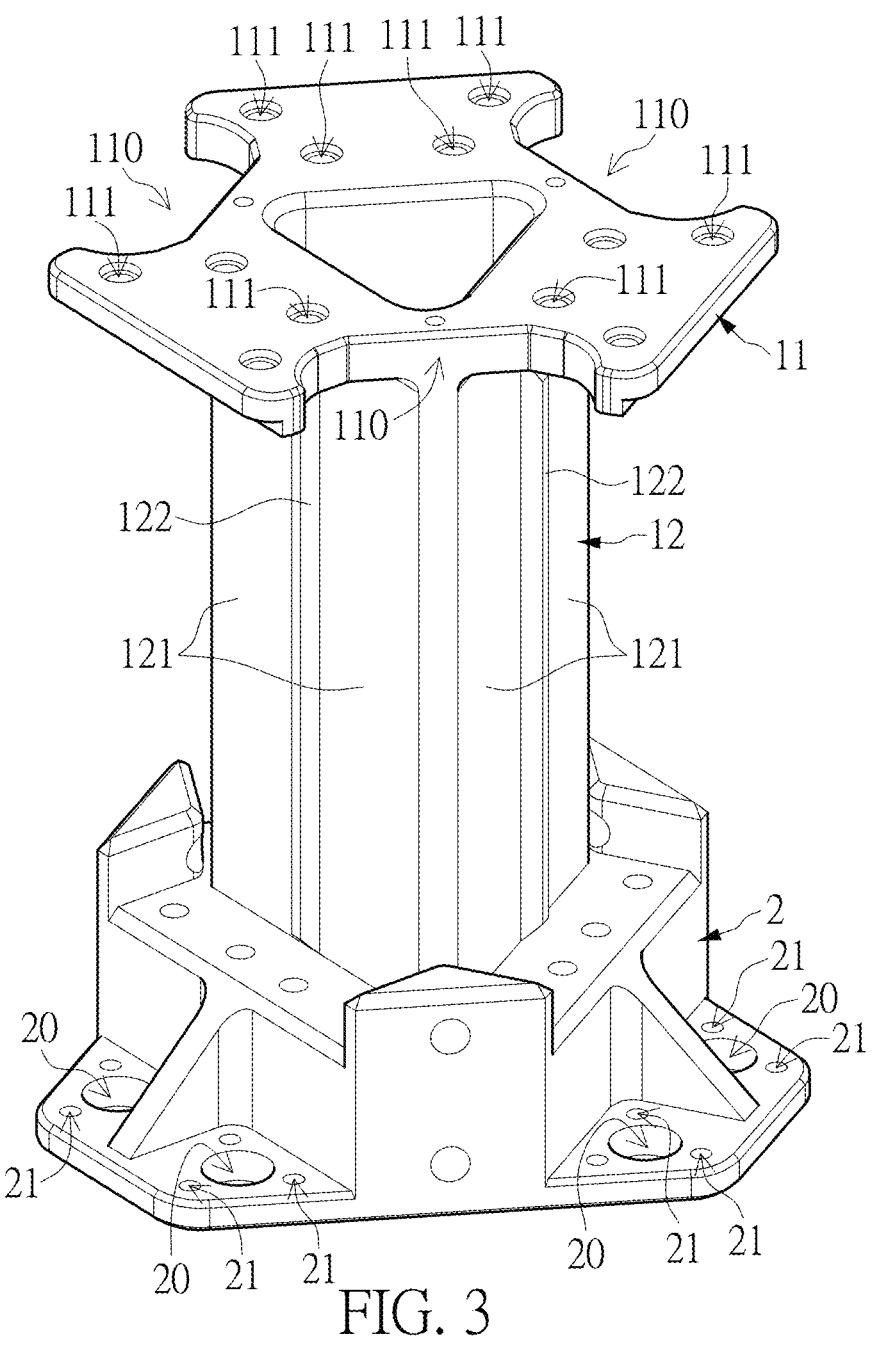
FIG. 3 is a schematic view of a main bracket and a pedestal according to the embodiment of the present disclosure.

Reference is made to FIG. 3. The main bracket 1 includes a base plate 11 and a base column 12. The base plate 11 is connected to one end of the base column 12, and the pedestal 2 is mounted to the other end of the base column 12. The base plate 11 has a plurality of recesses 110 that are formed on a side thereof. The base column 12 has a plurality of mounting surfaces 121. Specifically, a plurality of partition ribs 122 are provided on side walls of the base column 12, and the plurality of partition ribs 122 are used to divide the side walls into the plurality of mounting surfaces 121. The plurality of recesses 110 and the plurality of mounting surfaces 121 are arranged in a staggered manner. The mobile platform 3 includes a plurality of mechanical arm assemblies 31. The plurality of mechanical arm assemblies 31 are distributed in the plurality of recesses 110. The plurality of transmission assemblies 4 are distributed on the plurality of mounting surfaces 121.

The plurality of motor assemblies 5 are disposed on the pedestal 2. The plurality of motor assemblies 5 are coupled to the plurality of transmission assemblies 4, respectively. Each of the motor assemblies 5 has a plurality of fixing holes 50. The pedestal 2 has a plurality of threaded holes 21 that correspond to the plurality of fixing holes 50. The motor assemblies 5 cab be secured to the fixing holes 50 by respectively screwing a plurality of screws R into the plurality of threaded holes 21, so that the motor assemblies 5 are fixed to the pedestal 2.

Reference is further made to FIG. 1 and FIG. 2. Since the plurality of recesses 110 and the plurality of mounting surfaces 121 are arranged in an alternate manner, the mechanical arm assemblies 31 disposed in the recesses 110 and the transmission assemblies 4 disposed on the mounting surfaces 121 are also arranged in an alternate manner, and each of the transmission assemblies 4 is connected to an adjacent one of the mechanical arm assemblies 31. For example, in the present disclosure, the base column 12 has six mounting surfaces 121, so that quantity of the robotic arm assemblies 31, quantity of the transmission assemblies 4 and quantity of the motor assemblies 5 are all six.

Figure 4:
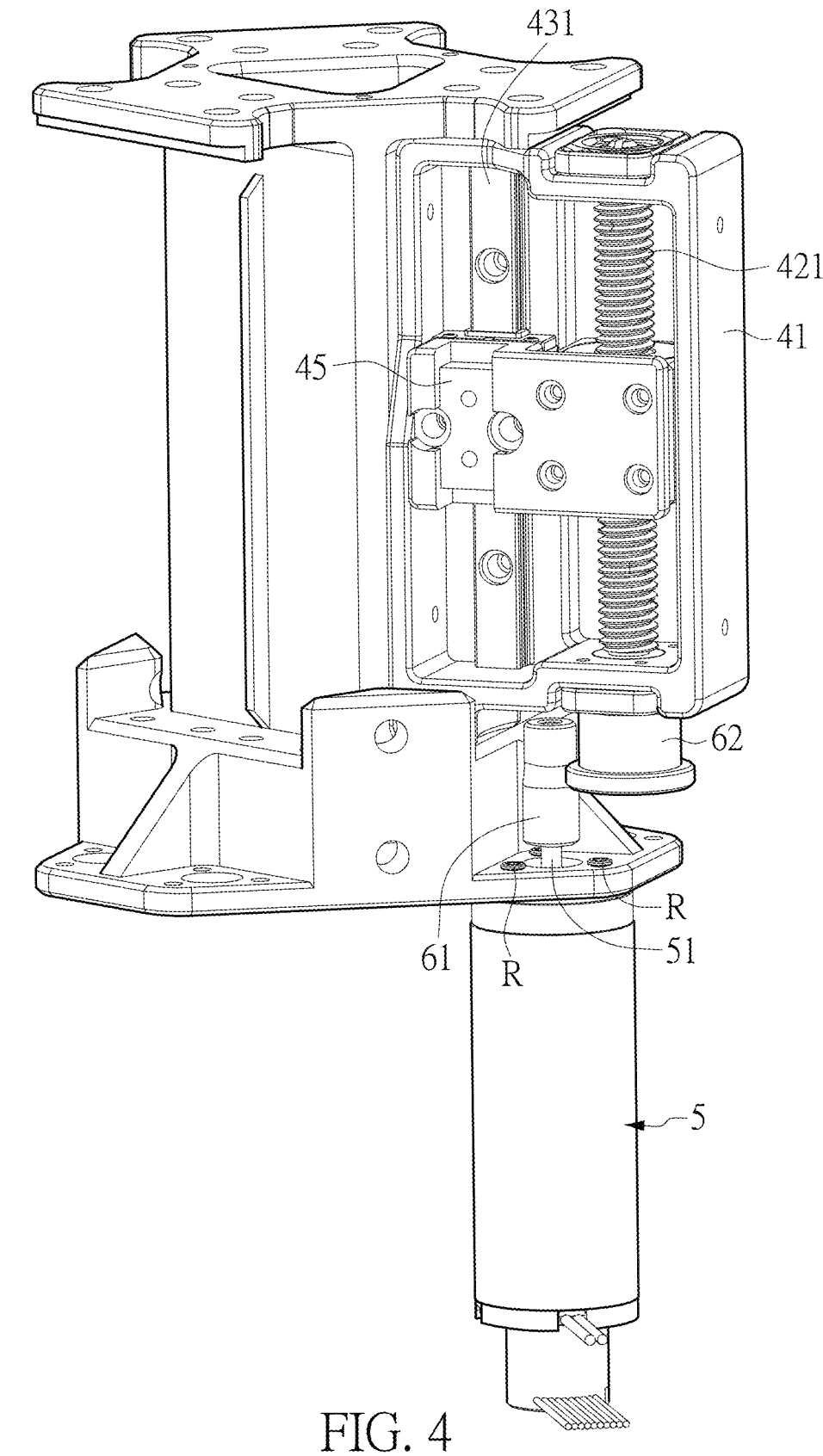
FIG. 4 is a schematic view of a transmission assembly and a motor assembly being disposed at the main bracket and the pedestal according to the embodiment of the present disclosure.
Figure 5:
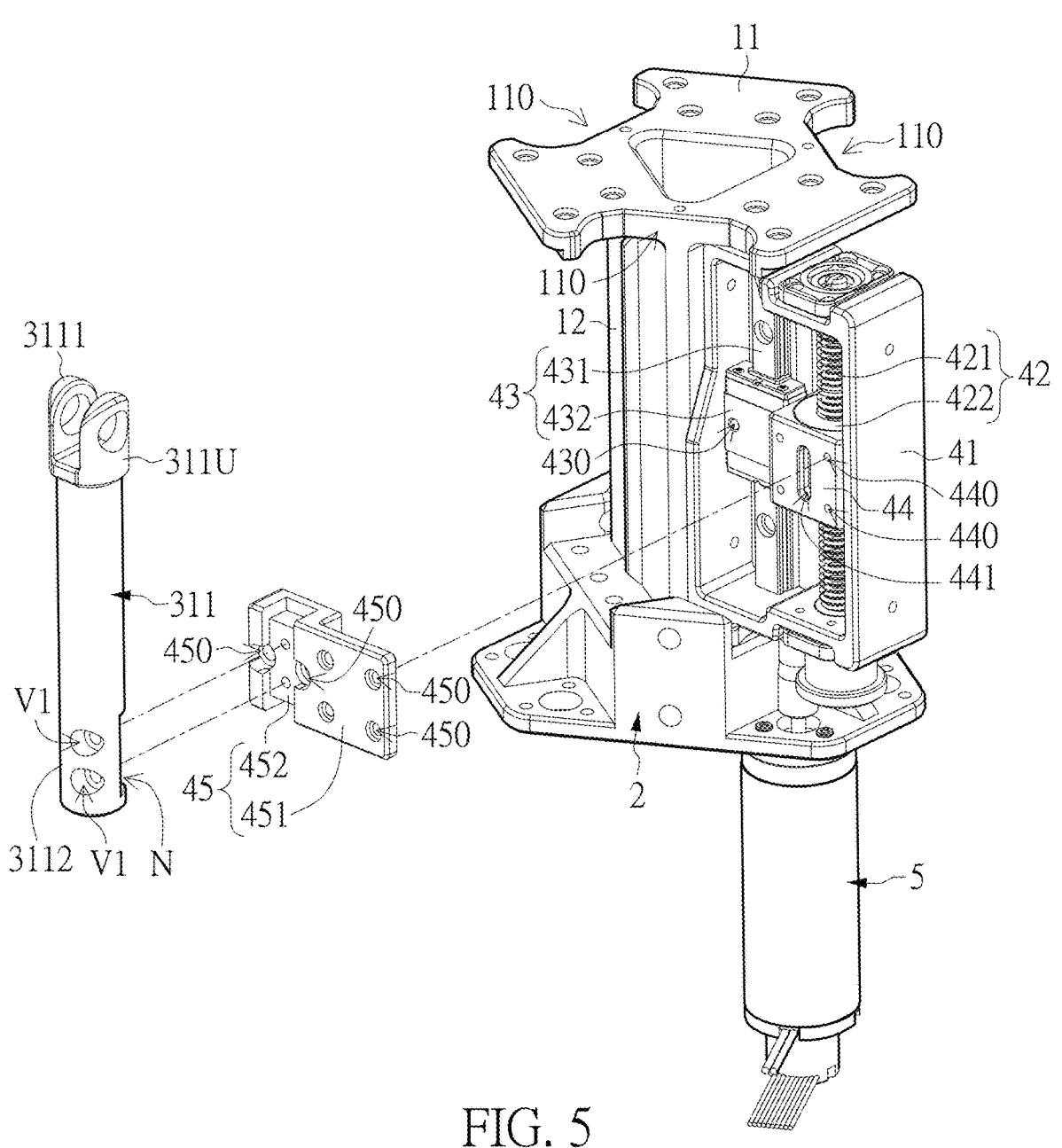
FIG. 5 is a schematic view of a first arm of a robotic arm group being assembled to the transmission assembly according to the embodiment of the present disclosure.

Reference is made to FIG. 4 and FIG. 5. Taking one of the transmission assemblies 4 as an example, the transmission assembly 4 includes a fixing frame 41, a first transmission set 42, and a second transmission set 43. The first transmission set 42 and the second transmission set 4 are arranged on the fixing frame 41 side by side. The first transmission set 42 includes a leadscrew 421 and a nut 422 that is movably disposed on the leadscrew 421. The second transmission set 43 includes a slide rail 431 and a slide block 432 movably disposed on the slide rail 431.

The transmission device D further includes a plurality of gear sets 6. The plurality of gear sets 6 are coupled to the plurality of motor assemblies 5 and the plurality of transmission assemblies 4. Each of the gear sets 6 is coupled between one of the motor assemblies 5 and one of the transmission assemblies 4. Each of the gear sets 6 includes a driving gear 61 and a driven gear 62. The driving gear 61 is connected to a driving shaft 51 of the motor assembly 5, and the driving shaft 51 passes through a through hole 20 of the pedestal 2 and is connected to the driving gear 61 (as shown in FIG. 4). The driven gear 62 is connected to the leadscrew 421 of the first transmission set 42 and meshes with the driving gear 61.

Reference is further made to FIG. 5. Each of the transmission assemblies 4 further includes a first connecting member 44 and a second connecting member 45. The first connecting member 44 is disposed on the nut 422. The second connecting member 45 includes a first connecting portion 451 and a second connecting portion 452 that is connected to the first connecting portion 451. For example, the first connecting portion 451 is provided with a protruding portion (not shown in FIG. 5) on one side thereof facing the first connecting member 44, and the first connecting portion 451 is provided with a groove 441 on one surface thereof facing the first connecting portion 451. The first connecting portion 451 includes a plurality of threaded holes 450. The first connecting member 44 includes a plurality of threaded holes 440. The plurality of threaded holes 440 respectively correspond to the plurality of threaded holes 450. When the first connecting portion 451 is connected to the first connecting member 44, the protruding portion is inserted into the groove 441 to achieve a positioning-limiting effect. Then, a plurality of screws (not shown in FIG. 5) are respectively screwed into the plurality of threaded holes 450 and the plurality of threaded holes 440, to secure the second connecting member 45 to the first connecting member 44.

Reference is further made to FIG. 5. The second connecting portion 452 is connected to the slide block 432. For example, the second connecting portion 452 and the slide block 432 include multiple corresponding threaded holes (i.e., the plurality of threaded holes 450 and a plurality of threaded holes 430). By inserting a plurality of screws (not shown in FIG. 5) through the threaded holes 450 and the threaded holes 430, the second connecting portion 452 is secured to the slide block 432, and thus further secured to the first connecting member 44. In other words, the second connecting member 45 is simultaneously fixed to both the first connecting member 44 and the slide block 432, allowing the first connecting member 44 and the slide block 432 to move together.

Figure 6:
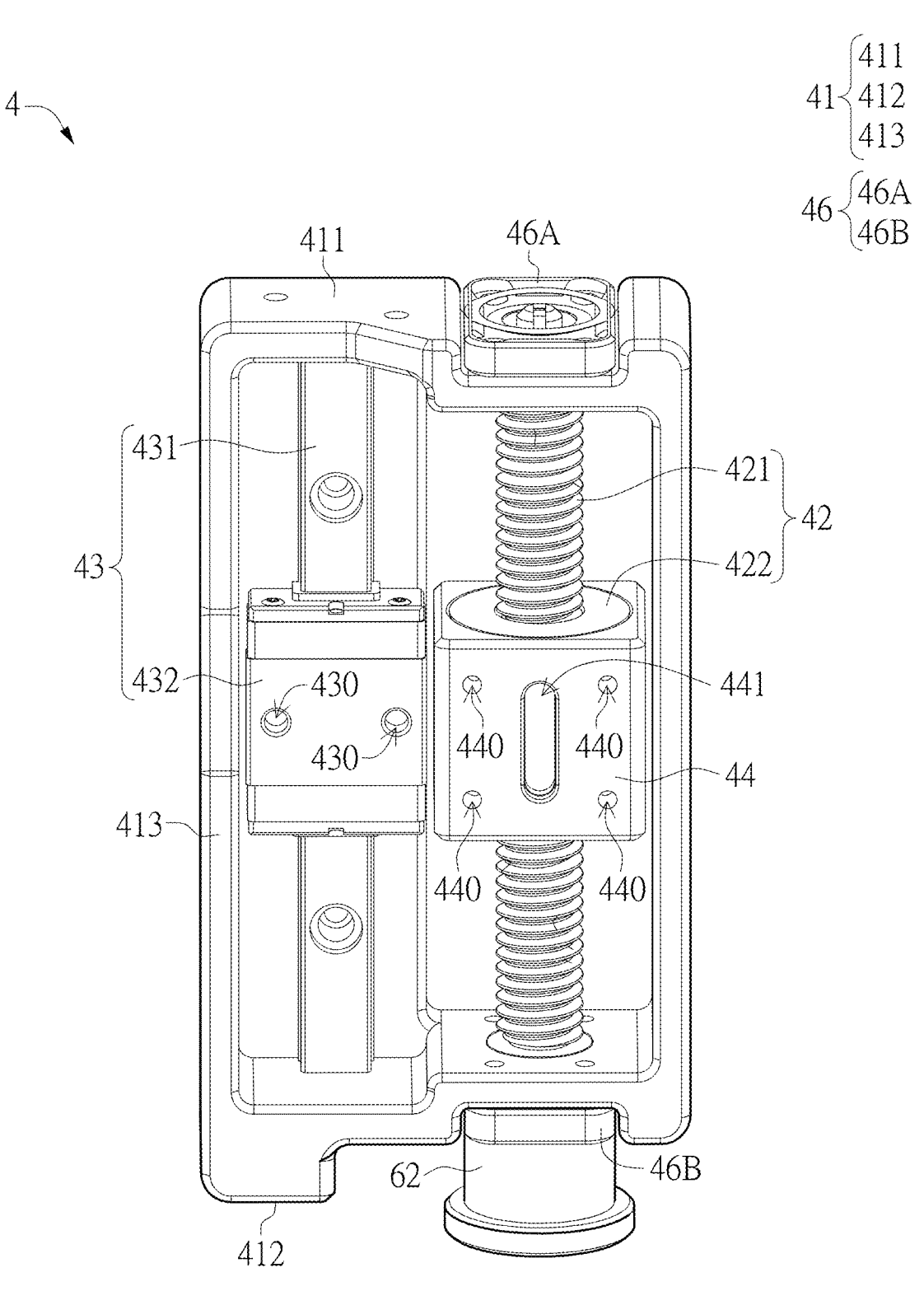
FIG. 6 is a schematic view of the transmission assembly according to the embodiment of the present disclosure.
Figure 7:
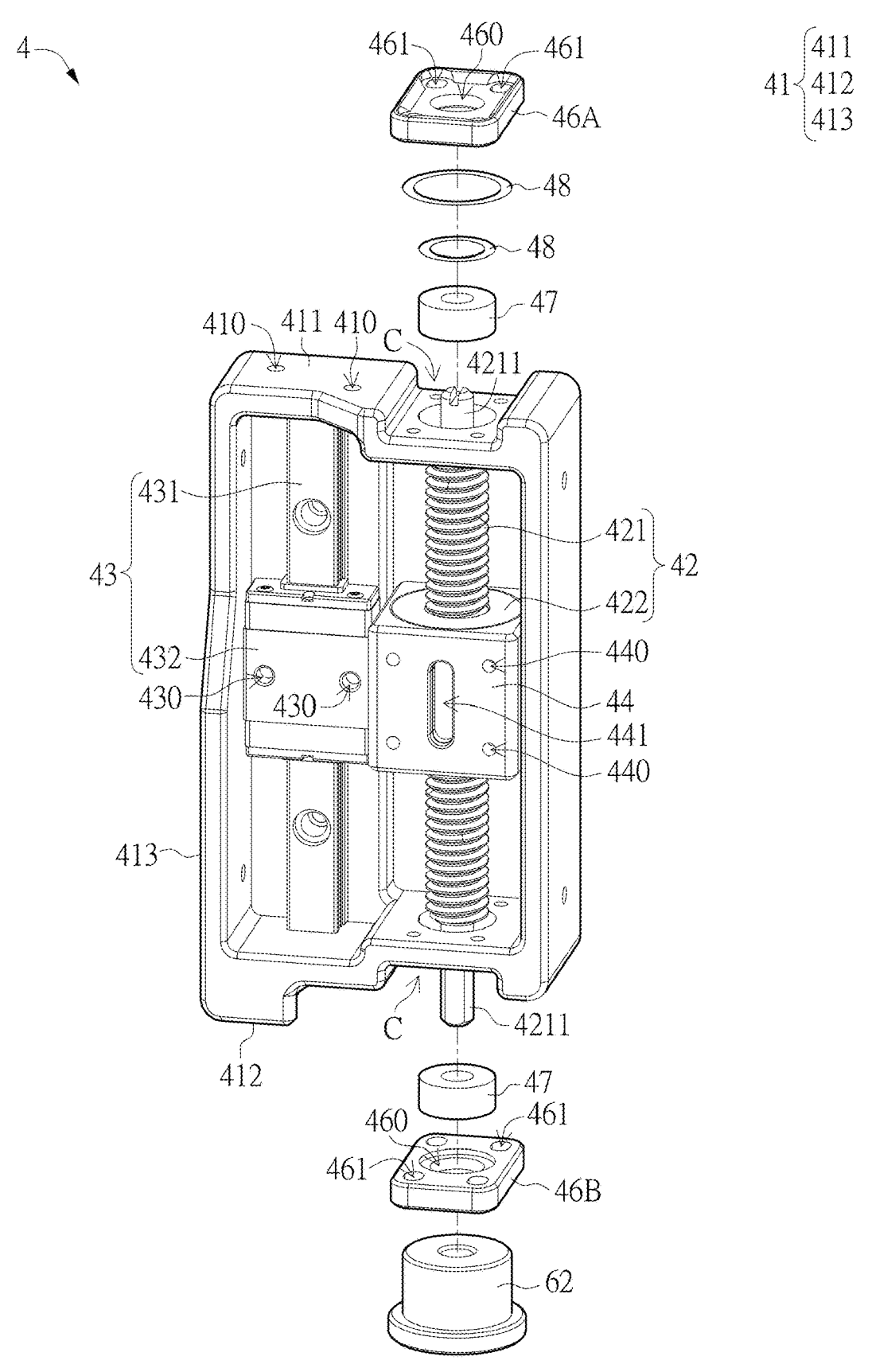
FIG. 7 is a schematic exploded view of the transmission assembly according to the embodiment of the present disclosure.
Figure 8:
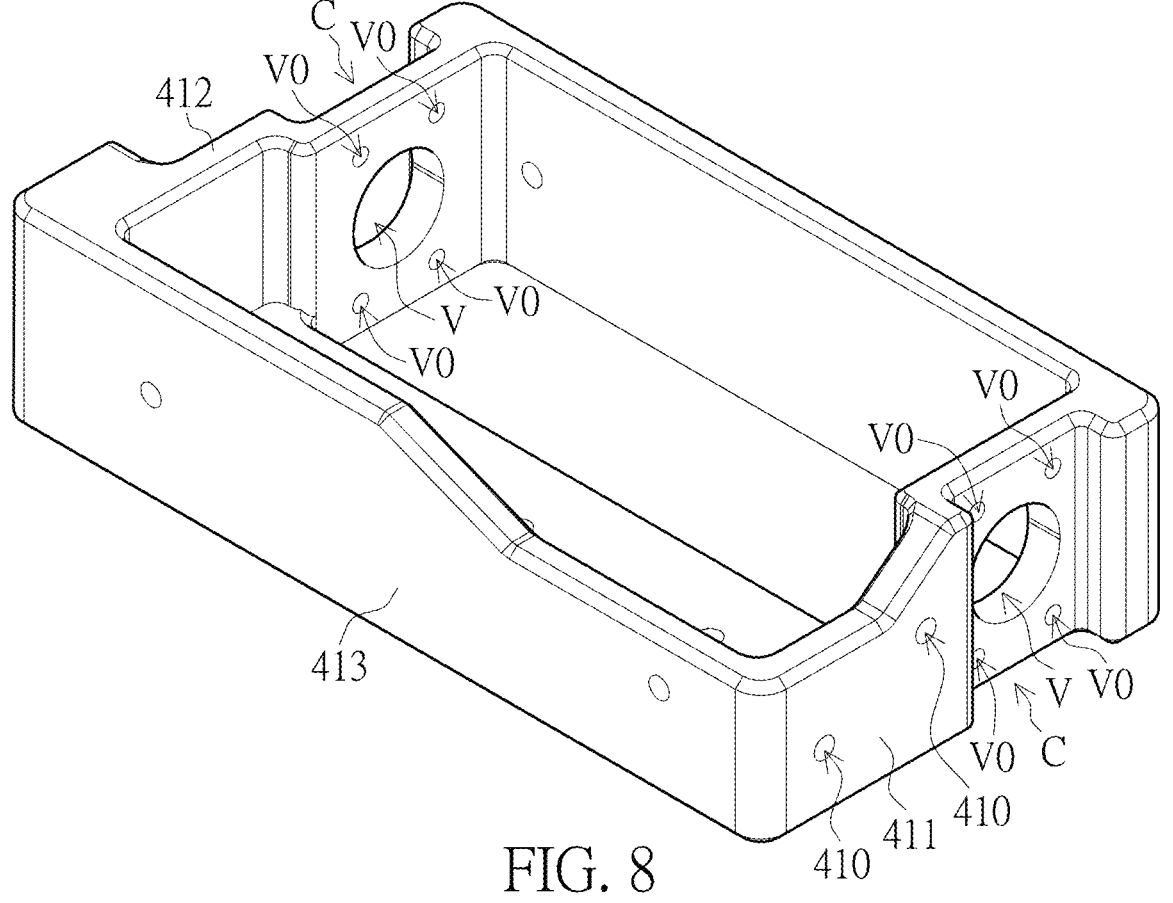
FIG. 8 is a schematic view of a fixing frame of the transmission assembly according to the embodiment of the present disclosure.
Figure 9:
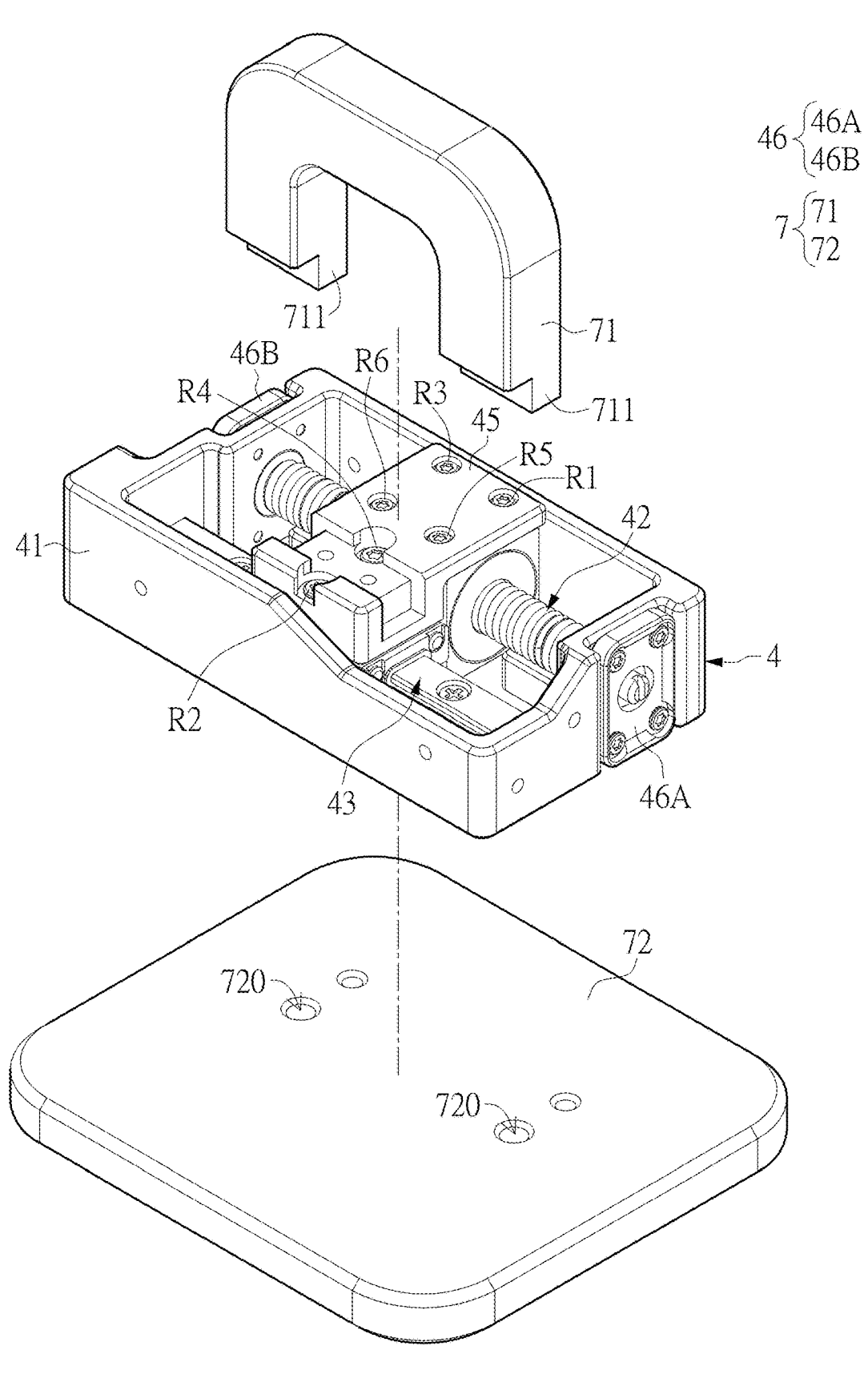
FIG. 9 is a schematic view of the transmission assembly being assembled on a fixture according to the embodiment of the present disclosure.
Figure 10:
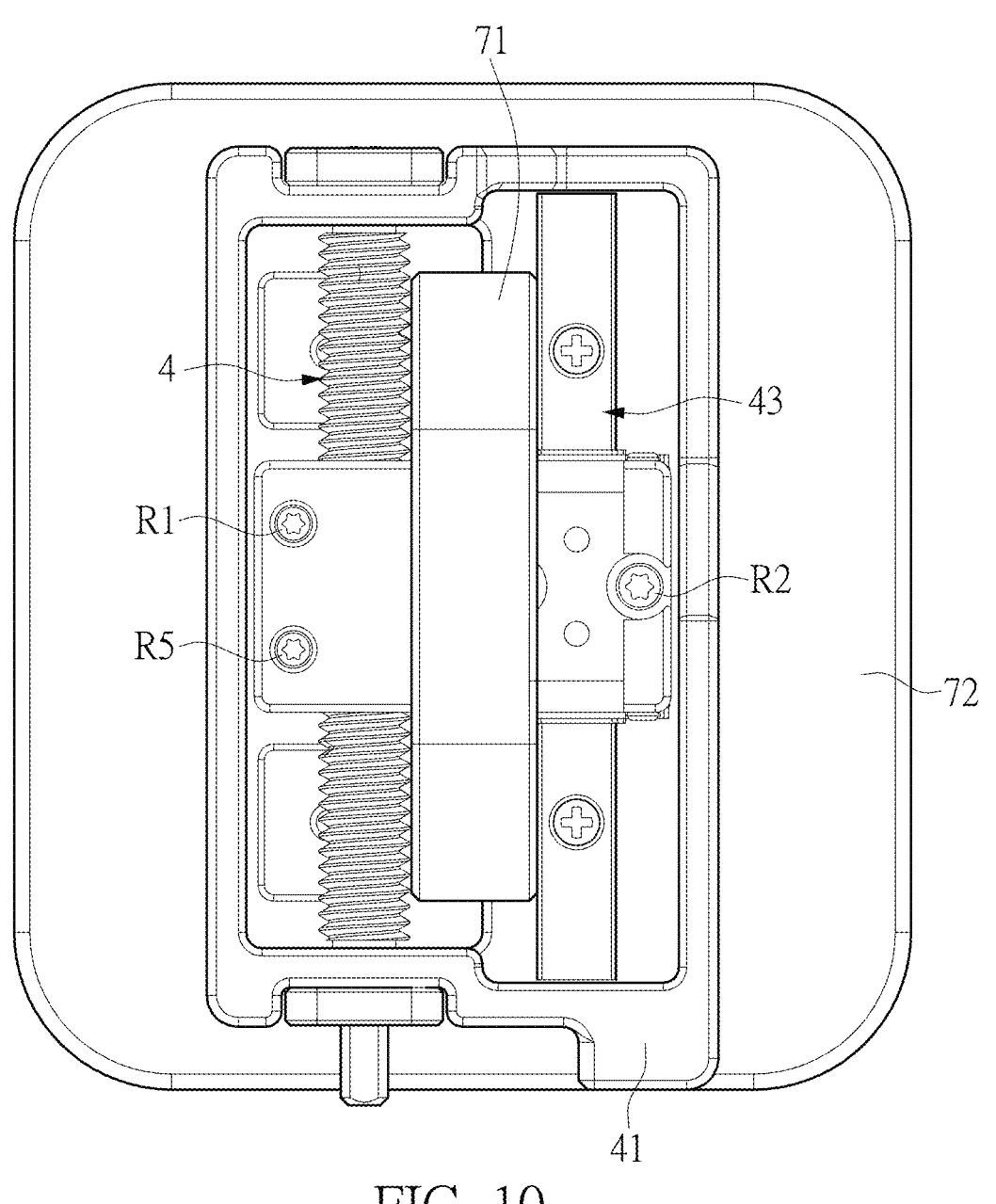
FIG. 10 is a first schematic view of the transmission assembly being calibrated on the fixture according to the embodiment of the present disclosure.
Figure 11:
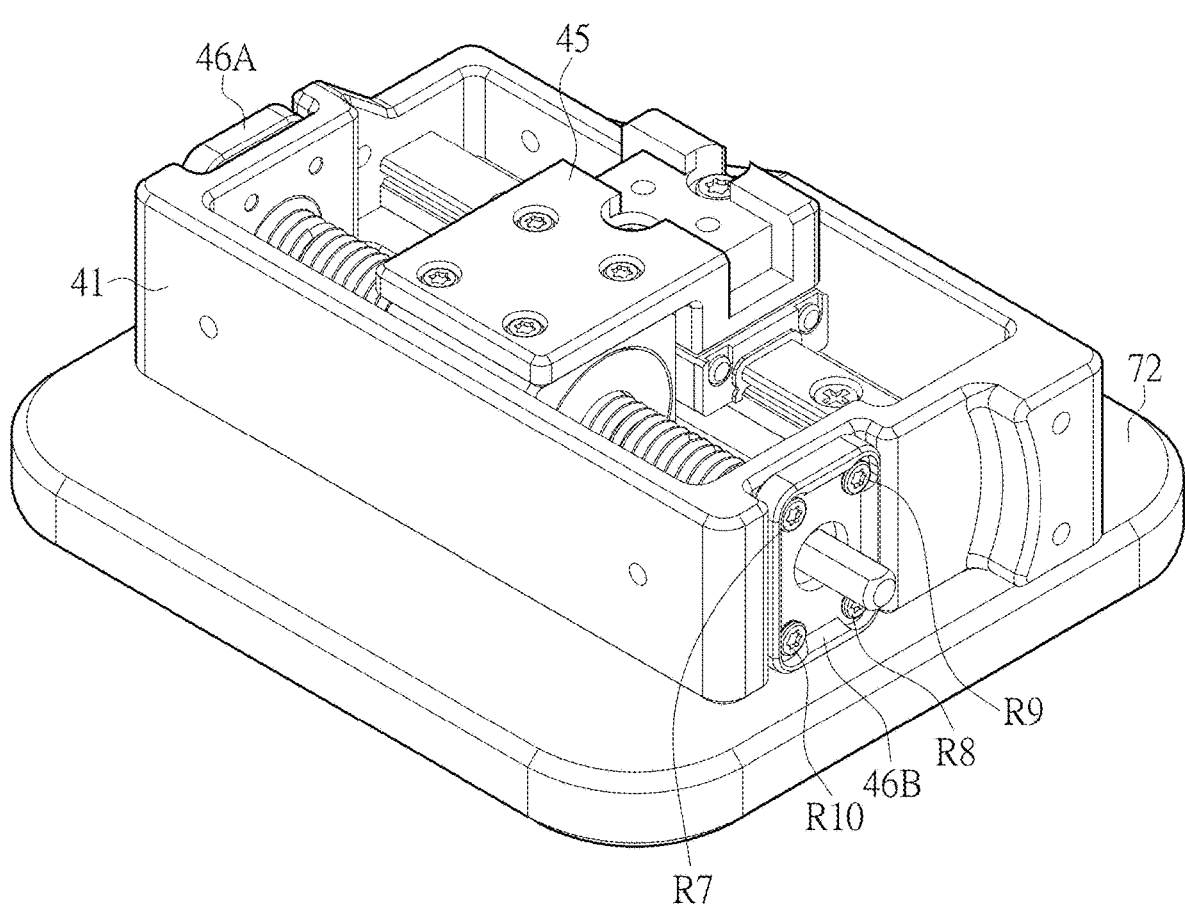
FIG. 11 is a second schematic view of the transmission assembly being calibrated on the fixture according to the embodiment of the present disclosure.
Figure 12:
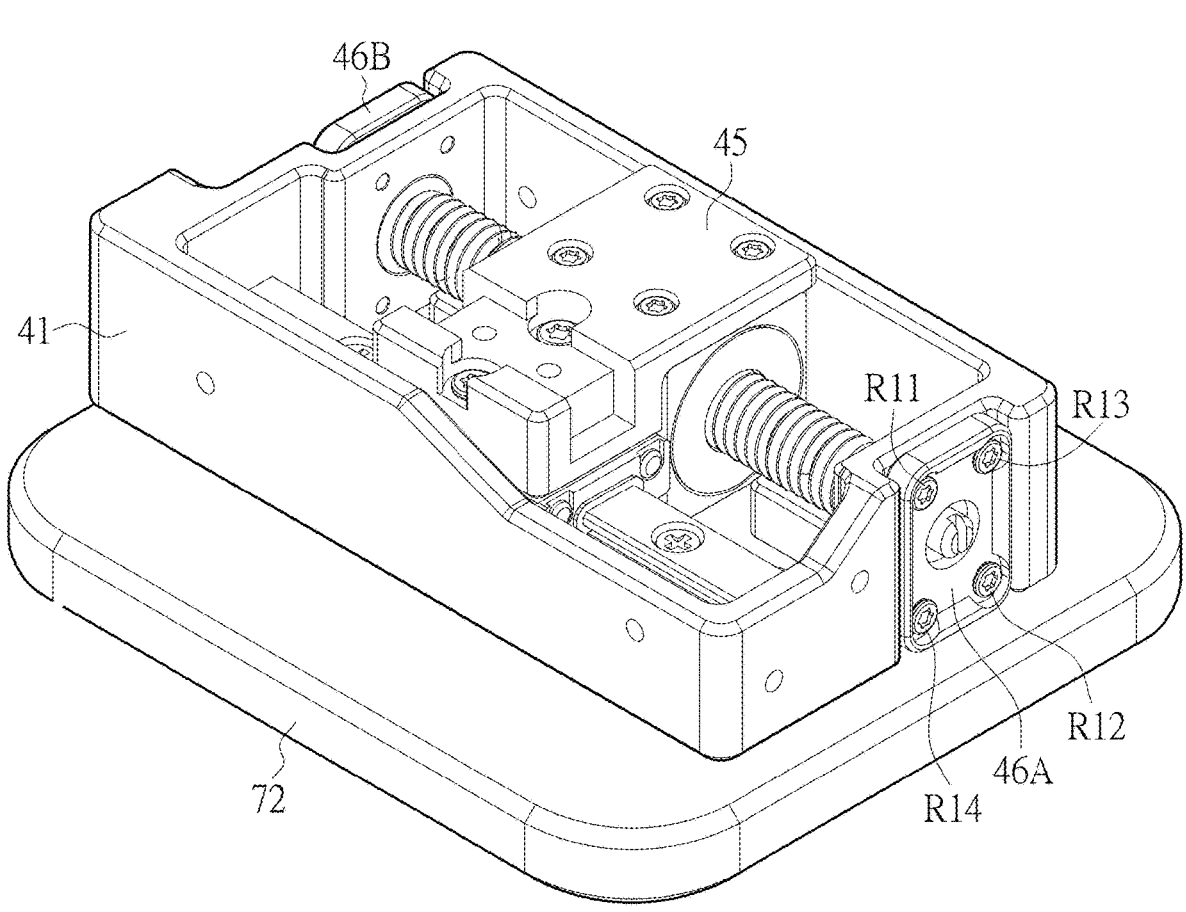
FIG. 12 is a third schematic view of the transmission assembly being calibrated on the fixture according to the embodiment of the present disclosure.

Reference is made to FIG. 6 to FIG. 8. The fixing frame 41 of any of the transmission assemblies 4 is a rectangular frame. The fixing frame 41 includes a first side wall 411, a second side wall 412, and a third side wall 413. The third side wall 413 is connected between the first side wall 411 and the second side wall 412. Each of the first side wall 411 and the second side wall 412 forms a concave portion C. The concave portion C includes a via hole V and a plurality of threaded holes V0 located around the via hole V. The first side wall 411 of the fixing frame 41 includes a plurality of fixing holes 410. The base plate 11 of the main bracket 1 includes a plurality of threaded holes 111. The plurality of threaded holes 111 respectively correspond to the plurality of fixing frames 41. For example, there are twelve fixing holes 410 and twelve threaded holes 111. As shown in FIG. 4, one of the fixing frames 41 abuts against one of the mounting surfaces 121 of the base column 12 through the side wall 413. Furthermore, the fixing frame 41 is fixed on the main bracket 1 through a plurality of screws (not shown in the figures) passing through the plurality of threaded holes 111 and the plurality of fixing holes 410 respectively, so that the transmission assembly 4 is fixed on the main bracket 1.

As shown in FIG. 7, the transmission assembly 4 further includes two side covers 46A/46B, two thrust bearings 47, and at least two washers 48. The two thrust bearings 47 are respectively disposed in the two via holes V, and are further connected to two ends 4211 of the leadscrew 421. The thrust bearings 47 can increase axial load capacity of the second transmission set 43. Each of the side covers 46A/46B has an opening 460 and a plurality of penetrating holes 461 located around the opening 460. The two openings 460 of the two side covers 46 respectively correspond to the two via holes V. The plurality of penetrating holes 461 respectively correspond to the plurality of threaded holes V0. Moreover, the two side covers 46 are respectively disposed at the two concave portions C, and a plurality of screws (not shown in the figures) are utilized to pass through the penetrating holes 461 and the threaded holes V0 to fix the two side covers 46 on the fixing frame 41. Each end 4211 of the leadscrew 421 is connected to the corresponding thrust bearing 47 and further extends into the corresponding opening 460. One of the at least two washers 48 is disposed between one of the concave portions C and the corresponding one of the side covers 46. The washers 48 can compensate the axial clearance caused by machining tolerances or assembly errors.

In the present disclosure, the via hole V forms an elliptical shape. The via hole V, which has an elliptical shape, can have a certain assembly tolerance, ensuring that the friction force between the thrust bearing 47 and the via hole V will not be excessive due to slight deviation and inclination of the leadscrew 421 during assembling. Additionally, the penetrating holes 461 of each of the side covers 46 can also be elliptical, allowing for slight deviation that may occur when assembling the side covers 46 onto the concave portions C, and ensures that the penetrating holes 461 of each of the side covers 46 can be aligned with the threaded holes V0 on each of the concave portions C, thereby allowing the screws to smoothly pass through the penetrating holes 461 and be secured into the threaded holes V0.

Reference is made to FIG. 9 to FIG. 12. When assembling each of the transmission assemblies 4, a calibration fixture 7 is used to ensure that the first transmission set 42 and the second transmission set 43 are parallel to each other. The calibration fixture 7 includes a U-shaped auxiliary member 71 and a flat plate 72. Calibration of each of the transmission assemblies 4 includes at least the following steps (steps S1 to S3 can be referenced in FIGS. 9 and 10, and steps S4 to S6 can be referenced in FIGS. 11 and 12):

Step S1: placing the transmission assembly 4 on the flat plate 72, such that the fixed frame 41, the first transmission set 42, and the second transmission set 43 can all abut against a surface of the flat plate 72.

Step S2: installing the U-shaped auxiliary member 71 between the first transmission set 42 and the second transmission set 43, and fixing the U-shaped auxiliary member 71 on the flat plate 72.

The U-shaped auxiliary member 71 provides lateral force to ensure that the fixed frame 41, the first transmission set

42, and the second transmission set 43 fully bear on the surface of the flat plate 72 to maintain parallelism among them.

The flat plate 72 has a plurality of penetrating holes 720, and the bottom of both ends 711 of the U-shaped auxiliary member 71 has a plurality of threaded holes corresponding to the penetrating holes 720 (not shown in the figures). Therefore, a plurality of screws can be utilized to pass through the penetrating holes 720 and be locked into the threaded holes to fix the U-shaped auxiliary member 71 onto the flat plate 72.

Step S3: locking the second connecting member 45 to the first transmission set 42 and the second transmission set 43 by sequentially locking screws R1 to R6. Furthermore, the locking sequence is as follows: the screw R1, the screw R2, the screw R3, the screw R4, the screw R5, and the screw R6.

Step S4: locking the second side cover 46B into one of the concave portions C by sequentially locking screws R7 to R10. Furthermore, the locking is as follows: the screw R7, the screw R8, the screw R9, and the screw R10. In addition, it should be noted that, for the convenience of illustration, the U-shaped auxiliary member 71 is omitted in FIGS. 11 and 12.

Step S5: installing at least one washer 48 between the first side cover 46A and the fixed frame 41 to adjust a gap between the first side cover 46A and the fixed frame 41.

Step S6: after installing the washer between the first side cover 46A and the fixed frame 41 to adjust the gap, the first side cover 46A is locked into one of the concave portions C by sequentially locking screws R11 to R14. Furthermore, the locking sequence is as follows: the screw R11, the screw R12 the screw R13, and the screw R14. After securing the screw R1 to R14, the U-shaped auxiliary member 71 and the flat plate 72 are further removed.

By fixing one side cover (i.e., the second side cover 46B) and then fixing another side cover (i.e., the first side cover 46A), the clearance error can be eliminated as much as possible when the first transmission set 42 and the second transmission set 43 are assembled to the fixed frame 41. In addition, the screws R11 to R14 are tightened according to a fixed torque to prevent the transmission device from loosening caused by vibration during operation, thereby extending lifetime of the transmission device. If friction force is found too large after locking, the first side cover 46A can be disassembled and the washer 48 can be replaced with one having a different thickness.

Reference is made to FIGS. 1, 5, 13, and 14. The mobile platform 3 further includes a base stage 32 (as shown in FIG. 1). The plurality of mechanical arm assemblies 31 are connected to the base stage 32. Each of the mechanical arm assemblies 31 includes a first arm 311, a second arm 312, and an arm connector 313. A first end 3111 of the first arm 311 includes a first U-shaped joint 311U, a second end 3112 of the first arm 311 is connected to an adjacent one of the transmission assemblies 4.

Figure 13:
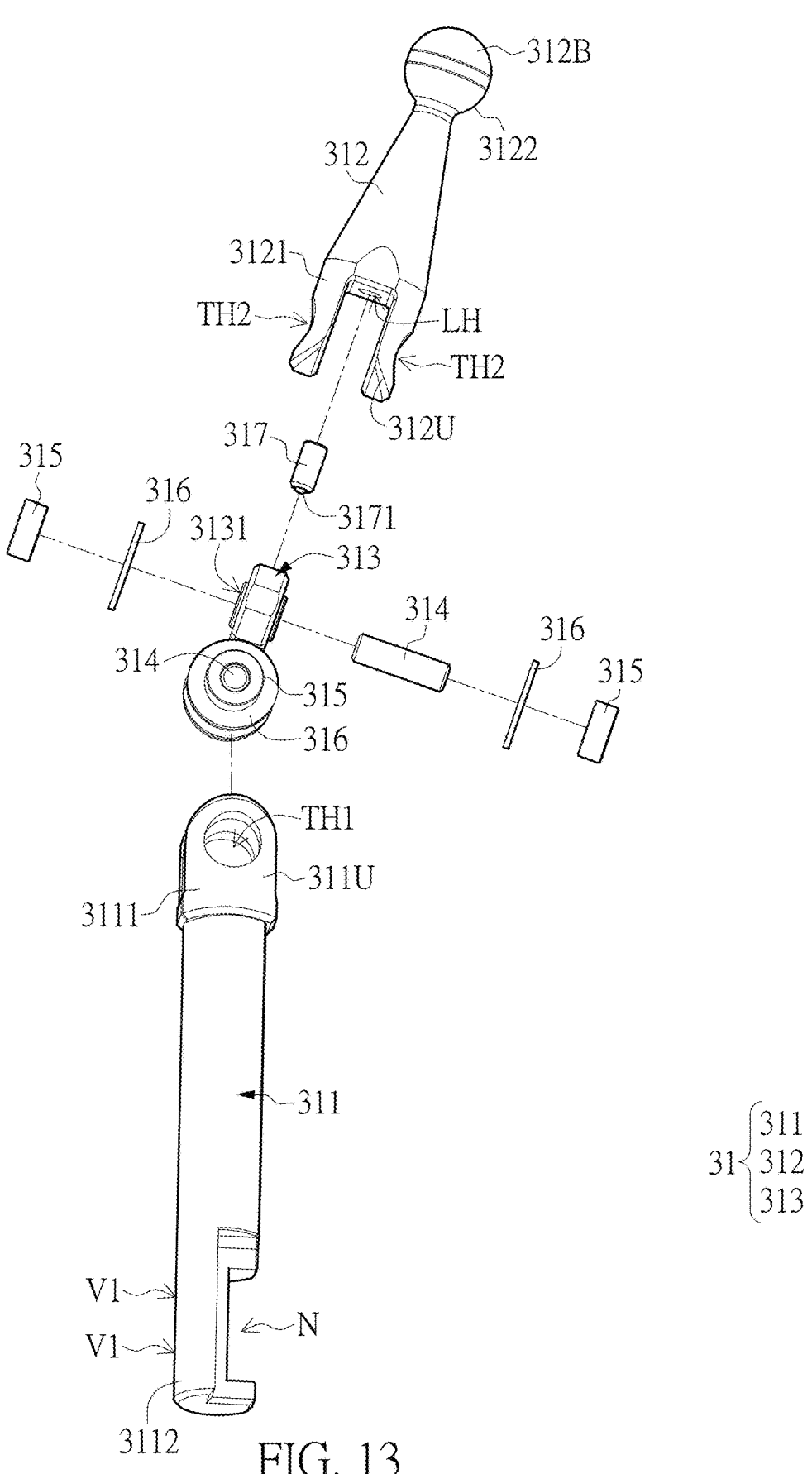
FIG. 13 is a schematic exploded view of the robotic arm group according to the embodiment of the present disclosure.
Figure 14:
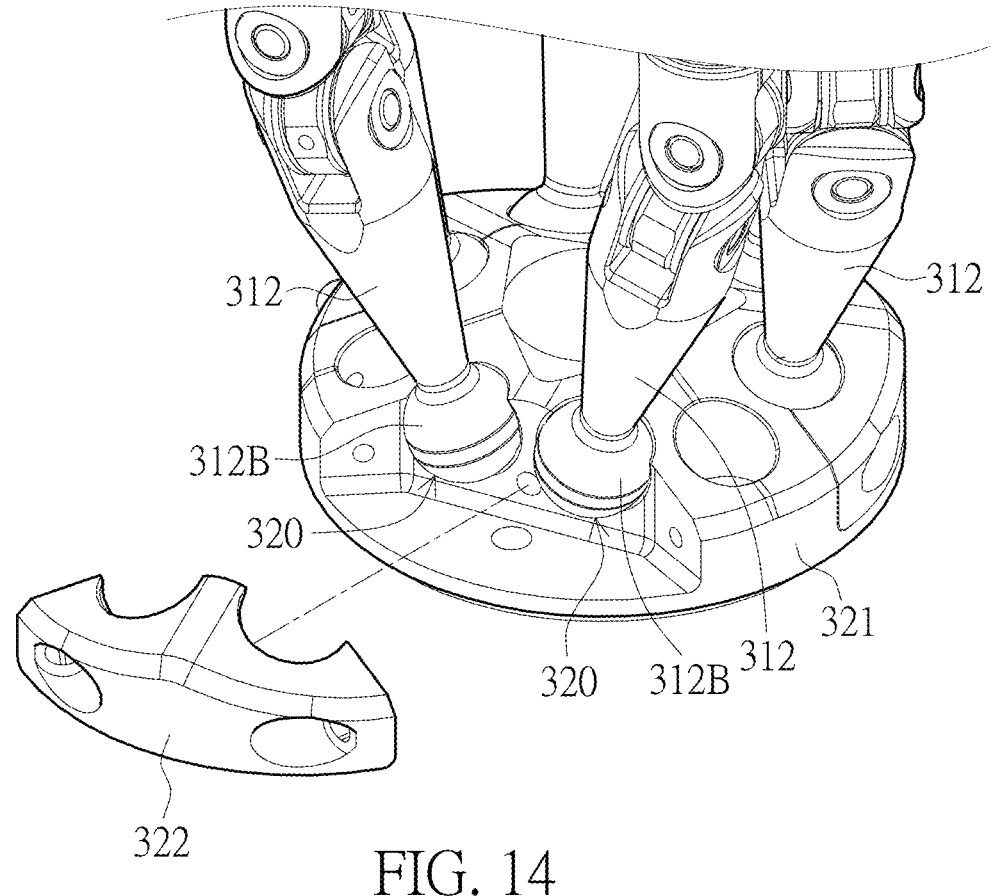
FIG. 14 is a schematic view of the robotic arm group being assembled on a base stage according to the embodiment of the present disclosure.

As shown in FIGS. 4, 5 and 13, the second end 3112 of the first arm 311 has a notch N and two threaded holes V1 passing through the notch N. A shape of the second connecting portion 452 of the second connecting member 45 corresponds to a contour of the notch N. Therefore, the first arm 311 can be installed on the second connecting portion 452 of the second connecting member 45 through the notch N, and the first arm 311 can further be locked to the transmission assembly 4 by inserting screws through the two threaded holes V1. Thereby, through the gear set 6, the motor assembly 5 drives the nut 422 in the first transmission set 42 to move along the leadscrew 421; and through the second connecting member 45, the motor assembly 5 drives the slide block 432 in the adjacent second transmission set 43 to move along the slide rail 431 together. Since the first arm 311 is also connected to the second connecting member 45, the second transmission set 43 drives the mechanical arm assembly 31 to extend or deflect, thereby causing the base stage 32 to move with multi-degrees of freedom.

A first end 3121 of the second arm 312 of each mechanical arm assembly 31 includes a second U-shaped joint 312U, and the second end 3122 of the second arm 312 includes a ball joint 312B. The base stage 32 includes a plurality of spherical grooves 320 corresponding to the plurality of ball joints 312B of the mechanical arm assemblies 31. Each of the mechanical arm assemblies 31 can be disposed in the corresponding spherical groove 320 through the ball joint 312B of the second arm 312. Furthermore, the base stage 32 includes a pedestal 321 and a plurality of auxiliary fixing members 322. The plurality of auxiliary fixing members 322 can be assembled or disassembled from the pedestal 321. When the second arm 312 is to be installed on the base stage 32, the auxiliary fixing member 322 is removed from the pedestal 321. Then, the ball joint 312B of the second arm 312 is placed in the spherical groove 320. After that, the auxiliary fixing member 322 is assembled to the pedestal 321 to complete the installation.

The ball joint 312B is fitted rather than fixed in the spherical groove 320. In other words, the second arm 312 can rotate freely. The transmission device D uses the ball joint 312B to replace an R-R-R rotary joint commonly used in the relevant art, which can significantly reduce the space occupied by the joint structure and further eliminate the singular points caused when the R-R-R rotary joints are aligned in a straight line, thereby increasing working range of the transmission device D. In addition, in the present disclosure, the washer (not shown in the figures) between the pedestal 321 and the auxiliary fixing member 322 can be selected to have different thicknesses to adjust the gap between the pedestal 321 and the auxiliary fixing member 322, preventing the ball joint 312B from receiving excessive clamping force in the spherical groove 320 and affecting rotation smoothness of the second arm 312.

The arm connector 313 is connected between the first U-shaped joint 311U and the second U-shaped joint 312U. The arm connector 313 includes two connecting holes 3131, and the two connecting holes 3131 are arranged in different directions. That is, two axes of the two connecting holes 3131 are different lines. Each of the mechanical arm assemblies 31 further includes two rotating shafts 314, four ball bearings 315, and four washers 316. The first U-shaped joint 311U includes two first through holes TH1, and the second U-shaped joint 312U includes two second through holes TH2. While assembling, the four ball bearings 315 are respectively disposed in the two first through holes TH1 and the two second through holes TH2, and the four washers 316 are respectively disposed between the arm connector 313 and the four ball bearings 315.

For example, the arm connector 313 is an eccentric universal joint, each of the ball bearings 315 is a flangeless ball bearing, and each of the washers 316 is a plastic lubricating washer. As shown in FIG. 13, taking assembling of the first U-shaped joint 311U and the arm connector 313 as an example, while assembling, the two ball bearings 315 tend to clamp the arm connector 313 therebetween, and the configuration of the two washers 316 ensures that along the direction parallel to the rotation shafts 314, there is no axial gap between the first U-shaped joint 311U and the arm connector 313.

The two rotating shafts 314 respectively pass through the two connecting holes 3131, and extending directions of the two rotating shafts 314 are perpendicular to each other. One of the rotating shafts 314 is connected to two ball bearings 315 and two washers 316 in the two first through holes TH1. The other rotating shaft 314 is connected to the two remaining ball bearings 315 and the two remaining washers 316 in the two second through holes TH2. Thereby, the arm connector 313 is connected to the first arm 311 and the second arm 312 through the configuration of the rotating shafts 314, the ball bearings 315 and the washers 316.

Each of the mechanical arm assemblies 31 further includes two limiting posts 317. The first U-shaped joint 311U and the second U-shaped joint 312U include two limiting holes LH. As shown in FIG. 13, only one of the limiting holes LH and one of the limiting posts 317 are shown in FIG. 13, and the limiting post is disposed in the limiting hole LH and leaves a head portion 3171 outside of the limiting hole LH. When the arm connector 313 is connected to the first arm 311 and the second arm 312, the arm connector 313 abuts against the head portion 3171 of the limiting post 317. In the present disclosure, the limiting post 317 is an elastic supporting member that provides a force when the arm connector 313 abuts against the limiting post 317, so as to ensure that along the direction parallel to the rotating shafts 314, there is no radial gap between the first U-shaped joint 311U and the arm connector 313.

Beneficial Effects of the Embodiment

In the disclosed transmission device D having a platform with multiple degrees of freedom, through the structural design that the recesses 110 and the mounting surfaces 121 of the main bracket are arranged in a staggered manner, the plurality of mechanical arm assemblies 31 of the mobile platform 3 can be distributed in the recesses 110, while the transmission assemblies 4 are distributed on the mounting surfaces 121. Thereby, the mechanical arm assemblies 31 and the transmission assemblies 4 can be assembled into a staggered arrangement structure, and assembling and disassembling of any one of the mechanical arm assemblies 31 and the transmission assemblies 4 will not be interfered by the others. This not only makes maintenance more convenient, but also enhances structural stability of the transmission device D.

Furthermore, the transmission assemblies 4 are fixed on the base plate 11, the mechanical arm assemblies 31 are connected to the transmission assemblies 4, the motor assemblies 5 are fixed on the pedestal 2, and the mechanical arm assemblies 31 and the transmission assemblies 4 can be assembled into a staggered structure. Therefore, in the transmission device D, assembling or disassembling of any one component will not be interfered by the rest components. For example, when disassembling the motor assembly 5, only the screws connecting the pedestal 2 and the motor assembly 5 need to be unscrewed. When disassembling a mobile platform 3, only the screws connecting the first arms 311 and the second connecting members 45 need to be unscrewed. When disassembling a transmission assembly 4, only the screws connecting the base plate 11 of the main frame 1 and the fixed frame 41 need to be unscrewed.

As shown in FIGS. 1 and 2, the threaded holes mentioned above for connecting various components are completely exposed and not blocked by other structures. Compared with existing transmission devices used in medical applications, the disclosed transmission device D having the platform with multiple degrees of freedom is easier to be assembled and disassembled. When one single component is damaged, the damaged component can be directly disassembled and replaced without dismantling the entire transmission device D.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A transmission device, comprising:
a main bracket including a base plate and a base column, wherein the base plate is connected to one end of the base column, the base plate includes a plurality of recesses formed on a side thereof, the base column has a plurality of mounting surfaces, and the plurality of recesses and the plurality of mounting surfaces are arranged in a staggered manner;
a pedestal mounted to another end of the base column;
a mobile platform including a plurality of mechanical arm assemblies, wherein the plurality of mechanical arm assemblies are distributed in the plurality of recesses;
a plurality of transmission assemblies distributed on the plurality of mounting surfaces, wherein each of the transmission assemblies is connected to an adjacent one of the mechanical arm assemblies, the plurality of mechanical arm assemblies and the plurality of transmission assemblies are arranged in a staggered manner, and each of the transmission assemblies includes:
a fixing frame fixed to one of the mounting surfaces of the base column, wherein the fixing frame includes a first side wall, a second side wall, and a third side wall, the third side wall is connected between the first side wall and the second side wall, each of the first side wall and the second side wall has a concave portion with a through hole;
a first transmission set disposed on the fixing frame, wherein the first transmission set includes a leadscrew and a nut that is movably disposed on the leadscrew;
a second transmission set disposed on the fixing frame, wherein the second transmission set includes a slide rail and a slide block movably disposed on the slide rail;
a first connecting member disposed on the nut;
a second connecting member including a first connecting portion and a second connecting portion, wherein the first connecting portion is connected to the first connecting member, one side of the second connecting portion is connected to the slide block, and another side of the second connecting portion is connected to an adjacent one of the mechanical arm assemblies; and
two side covers and two thrust bearings, wherein the two thrust bearings are respectively disposed at two ends of the leadscrew, the two side covers are respectively disposed at the two concave portions of the first side wall and the second side wall, each of the side covers has an opening, and the two openings of the side covers respectively correspond to the two through holes of the first side wall and the second side, and wherein each end of the leadscrew and the thrust bearing disposed at said end are placed in a corresponding ones of the through holes and the openings; and
a plurality of motor assemblies disposed on the pedestal, wherein the plurality of motor assemblies are coupled to the plurality of transmission assemblies, respectively.

2. The transmission device according to claim 1, wherein the leadscrew is parallel to the slide rail.

3. The transmission device according to claim 1, wherein each of the transmission assemblies further includes at least two washers, and one of the at least two washers is disposed between one of the concave portions and a corresponding one of the side covers.

4. The transmission device according to claim 1, further comprising a plurality of gear sets, wherein the plurality of gear sets are respectively coupled to the plurality of motor assemblies and the plurality of transmission assemblies, each of the gear sets includes a driving gear and a driven gear, the driving gear is connected to a driving shaft of a corresponding one of the motor assemblies, the driven gear is connected to the leadscrew of a corresponding one of the transmission assemblies, and the driven gear meshes with the driving gear.

5. The transmission device according to claim 1, wherein the mobile platform further includes a base stage, the plurality of mechanical arm assemblies are connected to the base stage, each of the mechanical arm assemblies includes a first arm, a second arm, and an arm connector, one end of the first arm includes a first U-shaped joint, another end of the first arm is connected to an adjacent one of the transmission assemblies, one end of the second arm includes a second U-shaped joint, and the arm connector is connected between the first U-shaped joint and the second U-shaped joint.

6. The transmission device according to claim 5, wherein each of the mechanical arm assemblies further includes two rotating shafts and four ball bearings, the arm connector includes two connecting holes, the first U-shaped joint includes two first through holes, and the second U-shaped joint includes two second through holes; wherein the four ball bearings are respectively disposed in the two first through holes and the two second through holes, one of the rotating shafts passes through one of the connecting holes to be connected with two of the ball bearings that are respectively located in the two first through holes, and another rotating shaft passes through another connecting hole to be connected with the remaining two ball bearings that are respectively located in the two second through holes.

7. The transmission device according to claim 6, wherein extending directions of the two rotating shafts are perpendicular to each other.

8. The transmission device according to claim 6, wherein each of the mechanical arm assemblies further includes four washers, and the four washers are respectively disposed between the arm connector and the four ball bearings.

9. The transmission device according to claim 6, wherein each of the mechanical arm assemblies further includes two limiting posts, the first U-shaped joint and the second U-shaped joint respectively include two limiting holes, the limiting posts are respectively disposed in the limiting holes, and upper and lower sides of the arm connector respectively abut against the two limiting posts.

10. The transmission device according to claim 5, wherein another end of the second arm of each of the mechanical arm assemblies includes a ball joint, the base stage includes a plurality of spherical grooves, and the ball joint is disposed in one of the spherical grooves.

* * * * *